United States Patent
Lo et al.

(10) Patent No.: US 11,281,230 B2
(45) Date of Patent: *Mar. 22, 2022

(54) VEHICLE CONTROL USING VISION-BASED FLASHING LIGHT SIGNAL DETECTION

(71) Applicant: Waymo LLC, Mountain View, CA (US)

(72) Inventors: Wan-Yen Lo, Sunnyvale, CA (US); David Ian Franklin Ferguson, San Francisco, CA (US); Abhijit Ogale, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 123 days.

This patent is subject to a terminal disclaimer.

(21) Appl. No.: 16/837,017

(22) Filed: Apr. 1, 2020

(65) Prior Publication Data
US 2020/0233430 A1    Jul. 23, 2020

Related U.S. Application Data

(63) Continuation of application No. 16/191,835, filed on Nov. 15, 2018, now Pat. No. 10,678,258, which is a continuation of application No. 15/671,316, filed on Aug. 8, 2017, now Pat. No. 10,168,712, which is a continuation of application No. 14/244,988, filed on Apr. 4, 2014, now Pat. No. 9,866,628.

(51) Int. Cl.
*G06K 9/00*       (2006.01)
*G05D 1/02*       (2020.01)
*G06K 9/46*       (2006.01)
*G06K 9/50*       (2006.01)

(52) U.S. Cl.
CPC ....... *G05D 1/0246* (2013.01); *G06K 9/00825* (2013.01); *G06K 9/4652* (2013.01); *G06K 9/4661* (2013.01); *G06K 9/50* (2013.01); *G05D 2201/0212* (2013.01)

(58) Field of Classification Search
CPC ... G06K 9/00825; G06K 2209/23; G06T 7/97
See application file for complete search history.

(56) References Cited

U.S. PATENT DOCUMENTS 7,566,851 B2   6/2009 Stein et al.
8,543,277 B2   9/2013 Higgins-Luthman
(Continued)

*Primary Examiner* — Guillermo M Rivera-Martinez
(74) *Attorney, Agent, or Firm* — McDonnell Boehnen Hulbert & Berghoff LLP

(57) ABSTRACT

A computing device of a first vehicle may receive a first image and a second image of a second vehicle having flashing light signals. The computing device may determine, in the first image and the second image, an image region that bounds the second vehicle such that the image region substantially encompasses the second vehicle. The computing device may determine a polar grid that partitions the image region in the first image and the second image into polar bins, and identify portions of image data exhibiting a change in color and a change in brightness between the first image and the second image. The computing device may determine a type of the flashing light signals and a type of the second vehicle; and accordingly provide instructions to control the first vehicle.

20 Claims, 11 Drawing Sheets

(56) References Cited

U.S. PATENT DOCUMENTS

| | | | |
|---|---|---|---|
| 8,737,737 B1* | 5/2014 | Feldman | G06K 9/4642 |
| | | | 382/170 |
| 9,766,628 B1 | 9/2017 | Lo et al. | |
| 10,168,712 B1 | 1/2019 | Lo et al. | |
| 2002/0154217 A1* | 10/2002 | Ikeda | G08G 1/0965 |
| | | | 348/148 |
| 2005/0060069 A1* | 3/2005 | Breed | G08G 1/164 |
| | | | 701/408 |
| 2007/0221822 A1* | 9/2007 | Stein | G06K 9/00825 |
| | | | 250/205 |
| 2008/0162027 A1* | 7/2008 | Murphy | G05D 1/0246 |
| | | | 701/117 |
| 2008/0260261 A1* | 10/2008 | Li | G06K 9/4609 |
| | | | 382/209 |
| 2009/0174536 A1* | 7/2009 | Rao | B60T 7/22 |
| | | | 340/436 |
| 2010/0026555 A1* | 2/2010 | Whittaker | G05D 1/024 |
| | | | 342/70 |
| 2011/0286627 A1* | 11/2011 | Takacs | G06K 9/4642 |
| | | | 382/103 |
| 2012/0044066 A1* | 2/2012 | Mauderer | G08G 1/161 |
| | | | 340/479 |
| 2012/0134576 A1* | 5/2012 | Sharma | G06K 9/6249 |
| | | | 382/155 |
| 2013/0129150 A1 | 5/2013 | Saito | |
| 2015/0161458 A1* | 6/2015 | Agnew | G06K 9/00825 |
| | | | 382/104 |

* cited by examiner

COMPUTER PROGRAM PRODUCT 1100

SIGNAL BEARING MEDIUM 1101

PROGRAM INSTRUCTIONS 1102

- RECEIVING, AT A COMPUTING DEVICE OF A FIRST VEHICLE, A FIRST IMAGE OF A SECOND VEHICLE CAPTURED BY AN IMAGE-CAPTURE DEVICE COUPLED TO THE FIRST VEHICLE AND A SECOND IMAGE CAPTURED BY THE IMAGE-CAPTURE DEVICE SUBSEQUENT TO CAPTURING THE FIRST IMAGE, WHERE THE SECOND VEHICLE HAS ONE OR MORE FLASHING LIGHT SIGNALS

- DETERMINING, IN THE FIRST IMAGE AND THE SECOND IMAGE, AN IMAGE REGION THAT BOUNDS THE SECOND VEHICLE SUCH THAT THE IMAGE REGION SUBSTANTIALLY ENCOMPASSES THE SECOND VEHICLE

- DETERMINING A POLAR GRID THAT PARTITIONS THE IMAGE REGION IN THE FIRST IMAGE AND THE SECOND IMAGE INTO A PLURALITY OF POLAR BINS, WHERE EACH POLAR BIN INCLUDES A SECTOR OF THE IMAGE REGION

- IDENTIFYING, BASED ON A COMPARISON OF IMAGE CONTENT OF POLAR BINS IN THE FIRST IMAGE TO IMAGE CONTENT OF CORRESPONDING POLAR BINS IN THE SECOND IMAGE, ONE OR MORE PORTIONS OF IMAGE DATA EXHIBITING A CHANGE IN COLOR AND A CHANGE IN BRIGHTNESS BETWEEN THE FIRST IMAGE AND THE SECOND IMAGE

- DETERMINING A TYPE OF THE ONE OR MORE FLASHING LIGHT SIGNALS OF THE SECOND VEHICLE AND A TYPE OF THE SECOND VEHICLE BASED ON (I) A NUMBER OF PORTIONS OF IMAGE DATA EXHIBITING THE CHANGE IN COLOR AND THE CHANGE IN BRIGHTNESS, (II) THE COLOR OF THE ONE OR MORE PORTIONS, (III) AND THE BRIGHTNESS OF THE ONE OR MORE PORTIONS

- PROVIDING, BY THE COMPUTING DEVICE, INSTRUCTIONS TO CONTROL THE FIRST VEHICLE BASED ON THE TYPE OF THE SECOND VEHICLE AND THE TYPE OF THE ONE OR MORE FLASHING LIGHT SIGNALS

| COMPUTER READABLE MEDIUM 1103 | COMPUTER RECORDABLE MEDIUM 1104 | COMMUNICATIONS MEDIUM 1105 |

FIGURE 11

VEHICLE CONTROL USING VISION-BASED FLASHING LIGHT SIGNAL DETECTION

CROSS REFERENCE TO RELATED APPLICATION

The present application is a continuation of U.S. patent application Ser. No. 16/191,835, filed on Nov. 15, 2018, and entitled "Vision-Based Object Detection Using a Polar Grid," which is a continuation of U.S. patent application Ser. No. 15/671,316, filed on Aug. 8, 2017, and entitled "Vision-Based Object Detection Using a Polar Grid," which issued as U.S. Pat. No. 10,168,712 and which is a continuation of U.S. patent application Ser. No. 14/244,988, filed on Apr. 4, 2014, and entitled "Vision-Based Object Detection Using a Polar Grid," which issued as U.S. Pat. No. 9,766,628, the entire contents of all of which are herein incorporated by reference as if fully set forth in this description.

BACKGROUND

Autonomous vehicles use various computing systems to aid in transporting passengers from one location to another. Some autonomous vehicles may require some initial input or continuous input from an operator, such as a pilot, driver, or passenger. Other systems, for example autopilot systems, may be used only when the system has been engaged, which permits the operator to switch from a manual mode (where the operator exercises a high degree of control over the movement of the vehicle) to an autonomous mode (where the vehicle essentially drives itself) to modes that lie somewhere in between.

SUMMARY

The present disclosure describes embodiments that relate to vision-based object detection using a polar grid. In one aspect, the present disclosure describes a method. The method includes receiving, at a computing device of a first vehicle, a first image of a second vehicle captured by an image-capture device coupled to the first vehicle and a second image captured by the image-capture device subsequent to capturing the first image. The second vehicle has one or more flashing light signals. The method also includes determining, in the first image and the second image, an image region that bounds the second vehicle such that the image region substantially encompasses the second vehicle. The method further includes determining a polar grid that partitions the image region in the first image and the second image into a plurality of polar bins, where each polar bin includes a sector of the image region. The method also includes identifying, based on a comparison of image content of polar bins in the first image to image content of corresponding polar bins in the second image, one or more portions of image data exhibiting a change in color and a change in brightness between the first image and the second image. The method further includes determining a type of the one or more flashing light signals of the second vehicle and a type of the second vehicle based on (i) a number of portions of image data exhibiting the change in color and the change in brightness, (ii) the color of the one or more portions, (iii) and the brightness of the one or more portions. The method also includes providing, by the computing device, instructions to control the first vehicle based on the type of the second vehicle and the type of the one or more flashing light signals.

In another aspect, the present disclosure describes a non-transitory computer readable medium having stored thereon executable instructions that, upon execution by a computing device of a first vehicle, cause the computing device to perform functions. The functions include receiving a first image of a second vehicle captured by an image-capture device coupled to the first vehicle and a second image captured by the image-capture device subsequent to capturing the first image, where the second vehicle has one or more flashing light signals. The functions also include determining, in the first image and the second image, an image region that bounds the second vehicle such that the image region substantially encompasses the second vehicle. The functions further include determining a polar grid that partitions the image region in the first image and the second image into a plurality of polar bins, where each polar bin of the plurality of polar bins is defined by two lines extending from a center portion of the image region to about a boundary of the image region. The functions also include identifying, based on a comparison of image content of polar bins in the first image to image content of corresponding polar bins in the second image, one or more portions of image data exhibiting a change in color and a change in brightness between the first image and the second image. The functions further include determining a type of the one or more flashing light signals of the second vehicle and a type of the second vehicle based on (i) a number of portions of image data exhibiting the change in color and the change in brightness, (ii) the color of the one or more portions, (iii) and the brightness of the one or more portions. The functions also include providing instructions to control the first vehicle based on the type of the second vehicle and the type of the one or more flashing light signals.

In still another aspect, the present disclosure describes a system. The system includes an image-capture device coupled to a first vehicle. The system also includes at least one processor in communication with the image-capture device. The system further includes a memory having stored thereon executable instructions that, upon execution by the at least one processor, cause the system to perform functions. The functions comprise receiving a first image of a second vehicle captured by the image-capture device and a second image captured by the image-capture device subsequent to capturing the first image, where the second vehicle has one or more flashing light signals. The functions also comprise determining, in the first image and the second image, an image region that bounds the second vehicle such that the image region substantially encompasses the second vehicle. The functions further comprise determining a polar grid that partitions the image region in the first image and the second image into a plurality of polar bins, where each polar bin of the plurality of polar bins is defined by two lines extending from a center portion of the image region to about a boundary of the image region. The functions also comprise identifying, based on a comparison of image content of polar bins in the first image to image content of corresponding polar bins in the second image, one or more portions of image data exhibiting a change in color and a change in brightness between the first image and the second image. The functions further comprise determining a type of the one or more flashing light signals of the second vehicle and a type of the second vehicle based on (i) a number of portions of image data exhibiting the change in color and the change in brightness, (ii) the color of the one or more portions, (iii) and the brightness of the one or more portions. The functions also comprise providing instructions to control the first vehicle based on the type of the second vehicle and the type of the one or more flashing light signals.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 11 is a schematic illustrating a conceptual partial view of a computer program, in accordance with an example embodiment.

DETAILED DESCRIPTION

Figure 1:
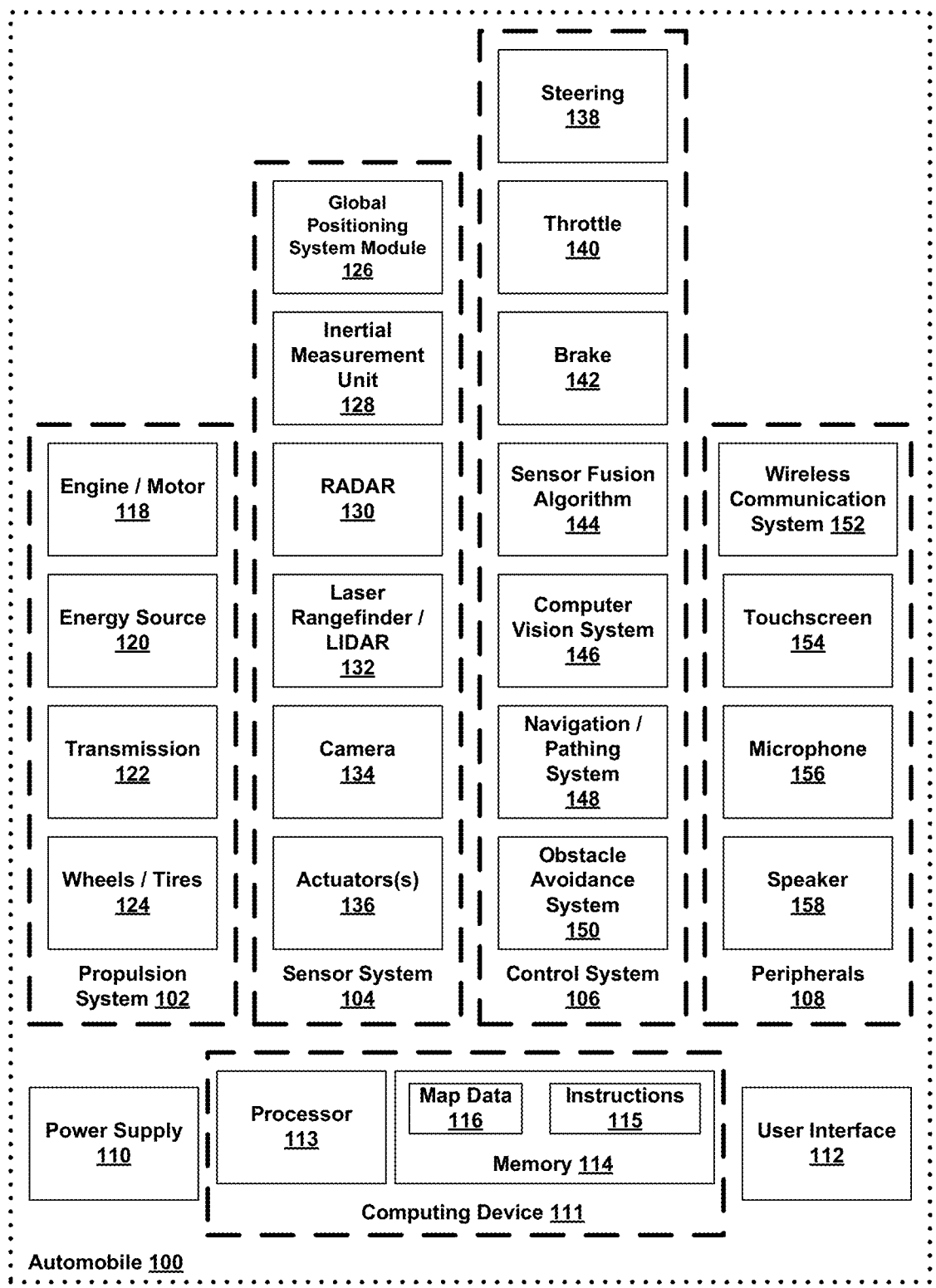
FIG. 1 is a simplified block diagram of an example automobile, in accordance with an example embodiment.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

I. INTRODUCTION

An autonomous vehicle operating on a road relies on detection of obstacles or objects on the road for navigation. A computing device of the vehicle may be configured to detect and trace objects between images received from an image-capture device coupled to the vehicle. For example, the computing device may be configured to detect and trace a potential emergency vehicle (e.g., a police car, a fire truck, and ambulance, etc.) across multiple images so as to make appropriate navigation decisions. Detecting and tracing an emergency vehicle may, for example, rely on identifying flashing lights that characterize emergency vehicles.

In an example, the computing device may determine an image region that bounds a given object in a vicinity of the vehicle. For instance, the computing device may detect an object (e.g., any type of vehicle) and may determine a bounding region, such as a bounding box, that substantially encompasses the object in the image. The computing device may trace the object in a sequence of images. However, tracing the object across the sequence of images may be difficult because, as the vehicle and the object move relative to each other, the position of the object changes from one image to a subsequently captured image. For instance, the bounding box may not be determined accurately in each image (e.g., the object may be slightly to the side of the estimated object location in a given image). Thus, accuracy of tracing the object in subsequent images may decrease because of position errors that might accumulate as the computing device detects the object in subsequent images.

To enhance object detection and tracing, the computing device may transform the rectangular bounding box into a polar grid (i.e., an angular region). The polar grid is configured to partition the bounding box into a plurality of polar bins. Each polar bin may include a sector of the bounding box. For instance, a polar bin may be defined by two lines extending from a center portion of the bounding box region to about a boundary of the bounding box. The computing device may assign each pixel in the image region within the bounding box to one of the polar bins.

Further, the computing device may identify bright lights within each polar grid bin in a first image. For example, the computing device may determine a number of image portions that exhibit characteristics of a bright light having an intensity greater than a threshold intensity. The threshold intensity may, for example, be indicative of a minimum intensity associated with flashing lights an emergency vehicle, a vehicular turn signal, brake lights, etc. The computing device may also receive a second image captured subsequent to capturing the first image. The computing device may partition a bounding box encompassing the object in the second image into a polar grid corresponding to the polar grid in the first image. Thus, each polar bin in the polar grid of the first image has a corresponding polar bin in the polar grid of the second image. Within each corresponding polar bin in the second image, the computing device may identify image portions corresponding to the image portions identified in the first image. The computing device may determine a change in color and a change in brightness for the image portions from the polar bin in the first image to the corresponding polar bin in the second image.

This process may be repeated to trace the image portions across multiple images (e.g., a sequence of images). Based on comparing the polar bins across multiple images, the computing device may determine whether a given image portion within a given polar bin represents flashing lights (characterized by a repetitive or cyclical change in color or brightness across the images). Based on determining a number and types of flashing light signals for the object, the computing device may determine a type of the object (e.g., whether the object is a police vehicle having at least two flashing light signals exhibiting a blue color, a fire truck having at least four flashing light signals, etc.) The computing device may provide instructions to control the vehicle based on the type of the vehicle (e.g., cause the vehicle to stop and allow a fire truck to pass).

II. EXAMPLE SYSTEMS

An example vehicle control system may be implemented in or may take the form of an automobile. Alternatively, a vehicle control system may be implemented in or take the form of other vehicles, such as cars, trucks, motorcycles, buses, boats, airplanes, helicopters, lawn mowers, recreational vehicles, amusement park vehicles, farm equipment, construction equipment, trams, golf carts, trains, and trolleys. Other vehicles are possible as well.

Further, an example system may take the form of a non-transitory computer-readable medium, which has program instructions stored thereon that are executable by at least one processor to provide the functionality described herein. An example system may also take the form of an automobile or a subsystem of an automobile that includes such a non-transitory computer-readable medium having such program instructions stored thereon.

Referring now to the Figures, FIG. 1 is a simplified block diagram of an example automobile 100, in accordance with an example embodiment. Components coupled to or included in the automobile 100 may include a propulsion system 102, a sensor system 104, a control system 106, peripherals 108, a power supply 110, a computing device 111, and a user interface 112. The computing device 111 may include a processor 113, and a memory 114. The computing device 111 may be a controller, or part of the controller, of the automobile 100. The memory 114 may include instructions 115 executable by the processor 113, and may also store map data 116. Components of the automobile 100 may be configured to work in an interconnected fashion with each other and/or with other components coupled to respective systems. For example, the power supply 110 may provide power to all the components of the automobile 100. The computing device 111 may be configured to receive information from and control the propulsion system 102, the sensor system 104, the control system 106, and the peripherals 108. The computing device 111 may be configured to generate a display of images on and receive inputs from the user interface 112.

In other examples, the automobile 100 may include more, fewer, or different systems, and each system may include more, fewer, or different components. Additionally, the systems and components shown may be combined or divided in any number of ways.

The propulsion system 102 may be configured to provide powered motion for the automobile 100. As shown, the propulsion system 102 includes an engine/motor 118, an energy source 120, a transmission 122, and wheels/tires 124.

The engine/motor 118 may be or include any combination of an internal combustion engine, an electric motor, a steam engine, and a Stirling engine. Other motors and engines are possible as well. In some examples, the propulsion system 102 could include multiple types of engines and/or motors. For instance, a gas-electric hybrid car could include a gasoline engine and an electric motor. Other examples are possible.

The energy source 120 may be a source of energy that powers the engine/motor 118 in full or in part. That is, the engine/motor 118 may be configured to convert the energy source 120 into mechanical energy. Examples of energy sources 120 include gasoline, diesel, other petroleum-based fuels, propane, other compressed gas-based fuels, ethanol, solar panels, batteries, and other sources of electrical power. The energy source(s) 120 could additionally or alternatively include any combination of fuel tanks, batteries, capacitors, and/or flywheels. In some examples, the energy source 120 may provide energy for other systems of the automobile 100 as well.

The transmission 122 may be configured to transmit mechanical power from the engine/motor 118 to the wheels/tires 124. To this end, the transmission 122 may include a gearbox, clutch, differential, drive shafts, and/or other elements. In examples where the transmission 122 includes drive shafts, the drive shafts could include one or more axles that are configured to be coupled to the wheels/tires 124.

The wheels/tires 124 of automobile 100 could be configured in various formats, including a unicycle, bicycle/motorcycle, tricycle, or car/truck four-wheel format. Other wheel/tire formats are possible as well, such as those including six or more wheels. The wheels/tires 124 of automobile 100 may be configured to rotate differentially with respect to other wheels/tires 124. In some examples, the wheels/tires 124 may include at least one wheel that is fixedly attached to the transmission 122 and at least one tire coupled to a rim of the wheel that could make contact with the driving surface. The wheels/tires 124 may include any combination of metal and rubber, or combination of other materials.

The propulsion system 102 may additionally or alternatively include components other than those shown.

The sensor system 104 may include a number of sensors configured to sense information about an environment in which the automobile 100 is located. As shown, the sensors of the sensor system include a Global Positioning System (GPS) module 126, an inertial measurement unit (IMU) 128, a radio detection and ranging (RADAR) unit 130, a laser rangefinder and/or light detection and ranging (LIDAR) unit 132, a camera 134, and actuators 136 configured to modify a position and/or orientation of the sensors. The sensor system 104 may include additional sensors as well, including, for example, sensors that monitor internal systems of the automobile 100 (e.g., an $O_2$ monitor, a fuel gauge, an engine oil temperature, etc.). Other sensors are possible as well.

The GPS module 126 may be any sensor configured to estimate a geographic location of the automobile 100. To this end, the GPS module 126 may include a transceiver configured to estimate a position of the automobile 100 with respect to the Earth, based on satellite-based positioning data. In an example, the computing device 111 may be configured to use the GPS module 126 in combination with the map data 116 to estimate a location of a lane boundary on road on which the automobile 100 may be travelling on. The GPS module 126 may take other forms as well.

The IMU 128 may be any combination of sensors configured to sense position and orientation changes of the automobile 100 based on inertial acceleration. In some examples, the combination of sensors may include, for example, accelerometers and gyroscopes. Other combinations of sensors are possible as well.

The RADAR unit 130 may be considered as an object detection system that may be configured to use radio waves to determine characteristics of the object such as range, altitude, direction, or speed of the object. The RADAR unit 130 may be configured to transmit pulses of radio waves or microwaves that may bounce off any object in a path of the waves. The object may return a part of energy of the waves to a receiver (e.g., dish or antenna), which may be part of the RADAR unit 130 as well. The RADAR unit 130 also may be configured to perform digital signal processing of received signals (bouncing off the object) and may be configured to identify the object.

Other systems similar to RADAR have been used in other parts of the electromagnetic spectrum. One example is LIDAR (light detection and ranging), which may be configured to use visible light from lasers rather than radio waves.

The LIDAR unit 132 may include a sensor configured to sense or detect objects in an environment in which the automobile 100 is located using light. Generally, LIDAR is an optical remote sensing technology that can measure distance to, or other properties of, a target by illuminating the target with light. As an example, the LIDAR unit 132 may include a laser source and/or laser scanner configured to emit laser pulses and a detector configured to receive reflections of the laser pulses. For example, the LIDAR unit 132 may include a laser range finder reflected by a rotating mirror, and the laser is scanned around a scene being digitized, in one or two dimensions, gathering distance measurements at specified angle intervals. In examples, the LIDAR unit 132 may include components such as light (e.g., laser) source, scanner and optics, photo-detector and receiver electronics, and position and navigation system.

In an example, The LIDAR unit 132 may be configured to use ultraviolet (UV), visible, or infrared light to image objects and can be used with a wide range of targets, including non-metallic objects. In one example, a narrow laser beam can be used to map physical features of an object with high resolution.

In examples, wavelengths in a range from about 10 micrometers (infrared) to about 250 nm (UV) could be used. Typically light is reflected via backscattering. Different types of scattering are used for different LIDAR applications, such as Rayleigh scattering, Mie scattering and Raman scattering, as well as fluorescence. Based on different kinds of backscattering, LIDAR can be accordingly called Rayleigh LIDAR, Mie LIDAR, Raman LIDAR and Na/Fe/K Fluorescence LIDAR, as examples. Suitable combinations of wavelengths can allow for remote mapping of objects by looking for wavelength-dependent changes in intensity of reflected signals, for example.

Three-dimensional (3D) imaging can be achieved using both scanning and non-scanning LIDAR systems. "3D gated viewing laser radar" is an example of a non-scanning laser ranging system that applies a pulsed laser and a fast gated camera. Imaging LIDAR can also be performed using an array of high speed detectors and a modulation sensitive detectors array typically built on single chips using CMOS (complementary metal-oxide-semiconductor) and hybrid CMOS/CCD (charge-coupled device) fabrication techniques. In these devices, each pixel may be processed locally by demodulation or gating at high speed such that the array can be processed to represent an image from a camera. Using this technique, many thousands of pixels may be acquired simultaneously to create a 3D point cloud representing an object or scene being detected by the LIDAR unit 132.

A point cloud may include a set of vertices in a 3D coordinate system. These vertices may be defined by X, Y, and Z coordinates, for example, and may represent an external surface of an object. The LIDAR unit 132 may be configured to create the point cloud by measuring a large number of points on the surface of the object, and may output the point cloud as a data file. As the result of a 3D scanning process of the object by the LIDAR unit 132, the point cloud can be used to identify and visualize the object.

In one example, the point cloud can be directly rendered to visualize the object. In another example, the point cloud may be converted to polygon or triangle mesh models through a process that may be referred to as surface reconstruction. Example techniques for converting a point cloud to a 3D surface may include Delaunay triangulation, alpha shapes, and ball pivoting. These techniques include building a network of triangles over existing vertices of the point cloud. Other example techniques may include converting the point cloud into a volumetric distance field and reconstructing an implicit surface so defined through a marching cubes algorithm.

The camera 134 may be any camera (e.g., a still camera, a video camera, etc.) configured to capture images of the environment in which the automobile 100 is located. To this end, the camera may be configured to detect visible light, or may be configured to detect light from other portions of the spectrum, such as infrared or ultraviolet light. Other types of cameras are possible as well. The camera 134 may be a two-dimensional detector, or may have a three-dimensional spatial range. In some examples, the camera 134 may be, for example, a range detector configured to generate a two-dimensional image indicating a distance from the camera 134 to a number of points in the environment. To this end, the camera 134 may use one or more range detecting techniques. For example, the camera 134 may be configured to use a structured light technique in which the automobile 100 illuminates an object in the environment with a predetermined light pattern, such as a grid or checkerboard pattern and uses the camera 134 to detect a reflection of the predetermined light pattern off the object. Based on distortions in the reflected light pattern, the automobile 100 may be configured to determine the distance to the points on the object. The predetermined light pattern may comprise infrared light, or light of another wavelength.

The actuators 136 may, for example, be configured to modify a position and/or orientation of the sensors.

The sensor system 104 may additionally or alternatively include components other than those shown.

The control system 106 may be configured to control operation of the automobile 100 and its components. To this end, the control system 106 may include a steering unit 138, a throttle 140, a brake unit 142, a sensor fusion algorithm 144, a computer vision system 146, a navigation or pathing system 148, and an obstacle avoidance system 150.

The steering unit 138 may be any combination of mechanisms configured to adjust the heading or direction of the automobile 100.

The throttle 140 may be any combination of mechanisms configured to control the operating speed and acceleration of the engine/motor 118 and, in turn, the speed and acceleration of the automobile 100.

The brake unit 142 may be any combination of mechanisms configured to decelerate the automobile 100. For example, the brake unit 142 may use friction to slow the wheels/tires 124. As another example, the brake unit 142 may be configured to be regenerative and convert the kinetic energy of the wheels/tires 124 to electric current. The brake unit 142 may take other forms as well.

The sensor fusion algorithm 144 may include an algorithm (or a computer program product storing an algorithm) executable by the computing device 111, for example. The sensor fusion algorithm 144 may be configured to accept data from the sensor system 104 as an input. The data may include, for example, data representing information sensed at the sensors of the sensor system 104. The sensor fusion algorithm 144 may include, for example, a Kalman filter, a Bayesian network, or another algorithm. The sensor fusion algorithm 144 further may be configured to provide various assessments based on the data from the sensor system 104, including, for example, evaluations of individual objects and/or features in the environment in which the automobile 100 is located, evaluations of particular situations, and/or evaluations of possible impacts based on particular situations. Other assessments are possible as well The computer vision system 146 may be any system configured to process and analyze images captured by the camera 134 in order to identify objects and/or features in the environment in which the automobile 100 is located, including, for example, lane information, traffic signals and obstacles. To this end, the computer vision system 146 may use an object recognition algorithm, a Structure from Motion (SFM) algorithm, video tracking, or other computer vision techniques. In some examples, the computer vision system 146 may additionally be configured to map the environment, track objects, estimate speed of objects, etc.

The navigation and pathing system 148 may be any system configured to determine a driving path for the automobile 100. The navigation and pathing system 148 may additionally be configured to update the driving path dynamically while the automobile 100 is in operation. In some examples, the navigation and pathing system 148 may be configured to incorporate data from the sensor fusion algorithm 144, the GPS module 126, and one or more predetermined maps so as to determine the driving path for the automobile 100.

The obstacle avoidance system 150 may be any system configured to identify, evaluate, and avoid or otherwise negotiate obstacles in the environment in which the automobile 100 is located.

The control system 106 may additionally or alternatively include components other than those shown.

Peripherals 108 may be configured to allow the automobile 100 to interact with external sensors, other automobiles, and/or a user. To this end, the peripherals 108 may include, for example, a wireless communication system 152, a touchscreen 154, a microphone 156, and/or a speaker 158.

The wireless communication system 152 may be any system configured to be wirelessly coupled to one or more other automobiles, sensors, or other entities, either directly or via a communication network. To this end, the wireless communication system 152 may include an antenna and a chipset for communicating with the other automobiles, sensors, or other entities either directly or over an air interface. The chipset or wireless communication system 152 in general may be arranged to communicate according to one or more other types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities. The wireless communication system 152 may take other forms as well.

The touchscreen 154 may be used by a user to input commands to the automobile 100. To this end, the touchscreen 154 may be configured to sense at least one of a position and a movement of a user's finger via capacitive sensing, resistance sensing, or a surface acoustic wave process, among other possibilities. The touchscreen 154 may be capable of sensing finger movement in a direction parallel or planar to the touchscreen surface, in a direction normal to the touchscreen surface, or both, and may also be capable of sensing a level of pressure applied to the touchscreen surface. The touchscreen 154 may be formed of one or more translucent or transparent insulating layers and one or more translucent or transparent conducting layers. The touchscreen 154 may take other forms as well.

The microphone 156 may be configured to receive audio (e.g., a voice command or other audio input) from a user of the automobile 100. Similarly, the speakers 158 may be configured to output audio to the user of the automobile 100.

The peripherals 108 may additionally or alternatively include components other than those shown.

The power supply 110 may be configured to provide power to some or all of the components of the automobile 100. To this end, the power supply 110 may include, for example, a rechargeable lithium-ion or lead-acid battery. In some examples, one or more banks of batteries could be configured to provide electrical power. Other power supply materials and configurations are possible as well. In some examples, the power supply 110 and energy source 120 may be implemented together, as in some all-electric cars.

The processor 113 included in the computing device 111 may comprise one or more general-purpose processors and/or one or more special-purpose processors (e.g., image processor, digital signal processor, etc.). To the extent that the processor 113 includes more than one processor, such processors could work separately or in combination. The computing device 111 may be configured to control functions of the automobile 100 based on input received through the user interface 112, for example.

The memory 114, in turn, may comprise one or more volatile and/or one or more non-volatile storage components, such as optical, magnetic, and/or organic storage, and the memory 114 may be integrated in whole or in part with the processor 113. The memory 114 may contain the instructions 115 (e.g., program logic) executable by the processor 113 to execute various automobile functions, including any of the functions or methods described herein.

The components of the automobile 100 could be configured to work in an interconnected fashion with other components within and/or outside their respective systems. To this end, the components and systems of the automobile 100 may be communicatively linked together by a system bus, network, and/or other connection mechanism (not shown).

Further, while each of the components and systems is shown to be integrated in the automobile 100, in some examples, one or more components or systems may be removably mounted on or otherwise connected (mechanically or electrically) to the automobile 100 using wired or wireless connections.

The automobile 100 may include one or more elements in addition to or instead of those shown. For example, the automobile 100 may include one or more additional interfaces and/or power supplies. Other additional components are possible as well. In these examples, the memory 114 may further include instructions executable by the processor 113 to control and/or communicate with the additional components.

Figure 2:
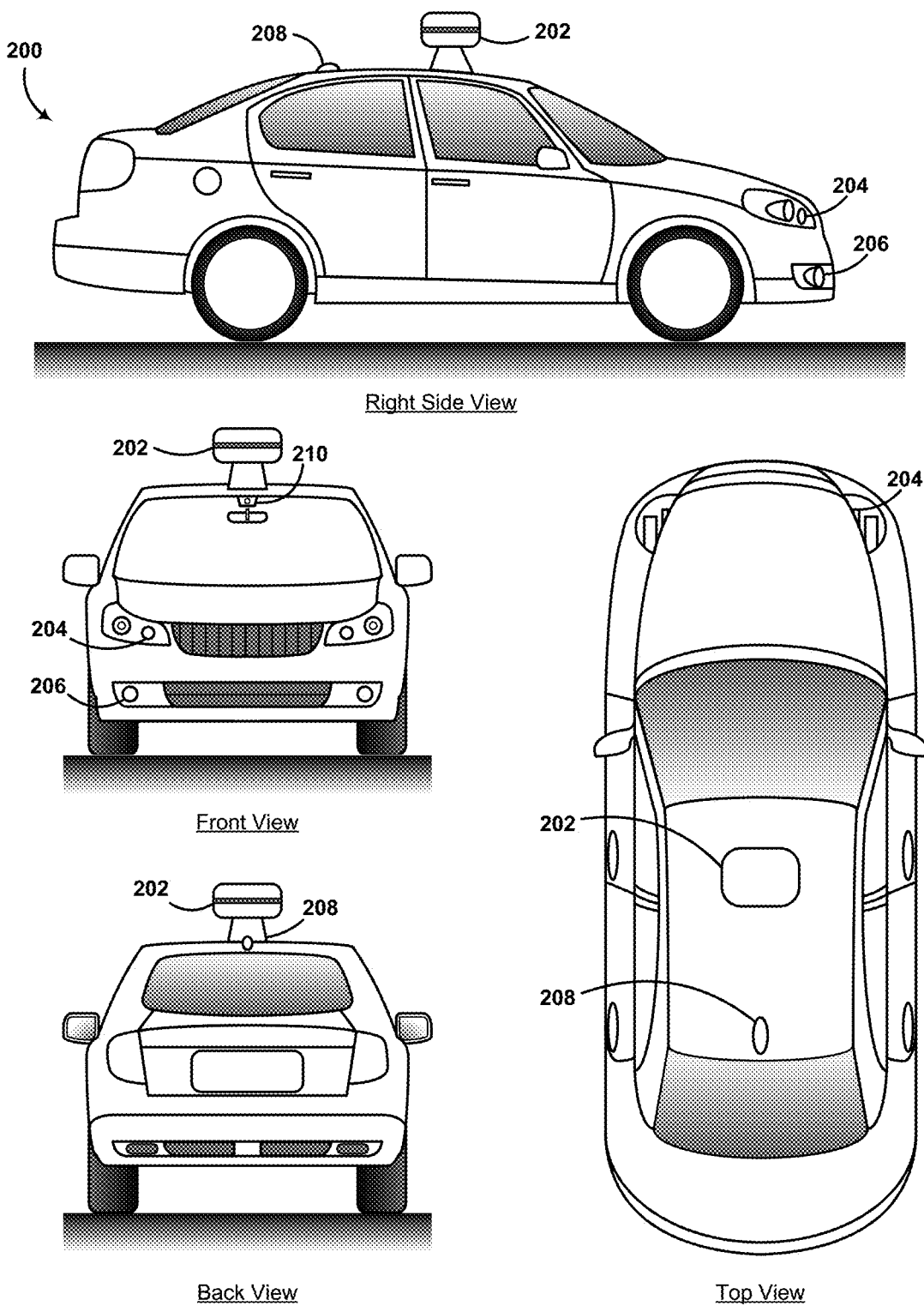
FIG. 2 illustrates an example automobile, in accordance with an example embodiment.

FIG. 2 illustrates an example automobile 200, in accordance with an embodiment. In particular, FIG. 2 shows a Right Side View, Front View, Back View, and Top View of the automobile 200. Although automobile 200 is illustrated in FIG. 2 as a car, other examples are possible. For instance, the automobile 200 could represent a truck, a van, a semitrailer truck, a motorcycle, a golf cart, an off-road vehicle, or a farm vehicle, among other examples. As shown, the automobile 200 includes a first sensor unit 202, a second sensor unit 204, a third sensor unit 206, a wireless communication system 208, and a camera 210.

Each of the first, second, and third sensor units 202-206 may include any combination of global positioning system sensors, inertial measurement units, RADAR units, LIDAR units, cameras, lane detection sensors, and acoustic sensors. Other types of sensors are possible as well.

While the first, second, and third sensor units 202 are shown to be mounted in particular locations on the automobile 200, in some examples the sensor unit 202 may be mounted elsewhere on the automobile 200, either inside or outside the automobile 200. Further, while only three sensor units are shown, in some examples more or fewer sensor units may be included in the automobile 200.

In some examples, one or more of the first, second, and third sensor units 202-206 may include one or more movable mounts on which the sensors may be movably mounted. The movable mount may include, for example, a rotating platform. Sensors mounted on the rotating platform could be rotated so that the sensors may obtain information from each direction around the automobile 200. Alternatively or additionally, the movable mount may include a tilting platform. Sensors mounted on the tilting platform could be tilted within a particular range of angles and/or azimuths so that the sensors may obtain information from a variety of angles. The movable mount may take other forms as well.

Further, in some examples, one or more of the first, second, and third sensor units 202-206 may include one or more actuators configured to adjust the position and/or orientation of sensors in the sensor unit by moving the sensors and/or movable mounts. Example actuators include motors, pneumatic actuators, hydraulic pistons, relays, solenoids, and piezoelectric actuators. Other actuators are possible as well.

The wireless communication system 208 may be any system configured to wirelessly couple to one or more other automobiles, sensors, or other entities, either directly or via a communication network as described above with respect to the wireless communication system 152 in FIG. 1. While the wireless communication system 208 is shown to be positioned on a roof of the automobile 200, in other examples the wireless communication system 208 could be located, fully or in part, elsewhere.

The camera 210 may be any camera (e.g., a still camera, a video camera, etc.) configured to capture images of the environment in which the automobile 200 is located. To this end, the camera 210 may take any of the forms described above with respect to the camera 134 in FIG. 1. While the camera 210 is shown to be mounted inside a front windshield of the automobile 200, in other examples the camera 210 may be mounted elsewhere on the automobile 200, either inside or outside the automobile 200.

The automobile 200 may include one or more other components in addition to or instead of those shown.

III. EXAMPLE METHODS

Figure 3:
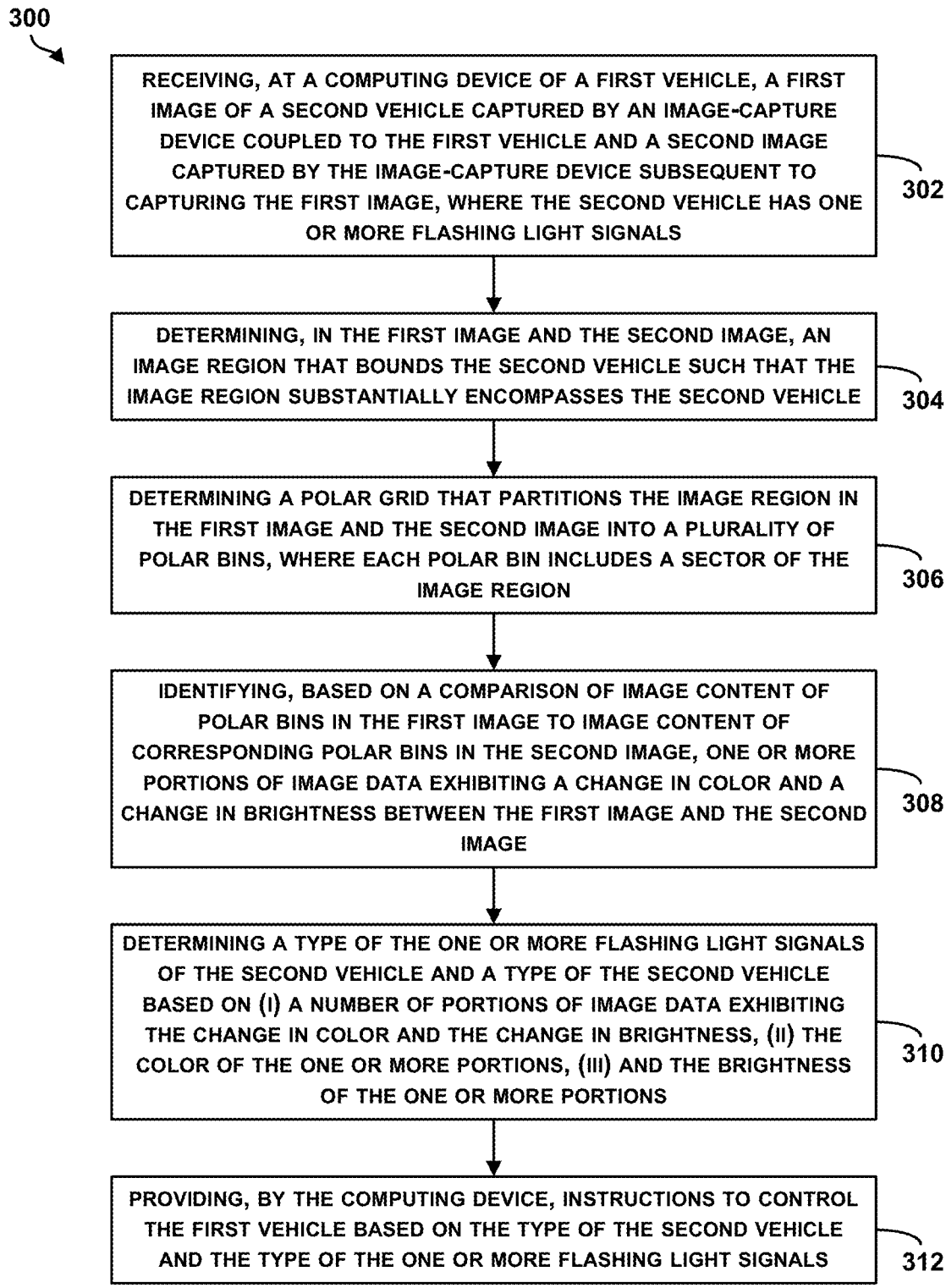
FIG. 3 is a flow chart of a method for vision-based object detection using a polar grid, in accordance with an example embodiment.

FIG. 3 is a flow chart of a method 300 for vision-based object detection using a polar grid, in accordance with an example embodiment. The method 300 may include one or more operations, functions, or actions as illustrated by one or more of blocks 302-312. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. The computer readable medium may include a non-transitory computer-readable medium, for example, such as computer-readable media that stores data for short periods of time like register memory, processor cache and Random Access Memory (RAM). The computer-readable medium may also include non-transitory media or memory, such as secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a computer-readable storage medium, a tangible storage device, or other article of manufacture, for example. In addition, for the method 300 and other processes and methods disclosed herein, each block in FIG. 3 may represent circuitry that is wired to perform the specific logical functions in the process.

At block 302, the method 300 includes receiving, at a computing device of a first vehicle, a first image of a second vehicle captured by an image-capture device coupled to the first vehicle and a second image captured by the image-capture device subsequent to capturing the first image, where the second vehicle has one or more flashing light signals. A controller or a computing device, such as the computing device 111 in FIG. 1, may be onboard the first vehicle or may be off-board but in wireless communication with the first vehicle, for example. Also, the computing device may be configured to control the first vehicle in an autonomous or semi-autonomous operation mode.

A camera, such as the camera 134 in FIG. 1 or the camera 210 in FIG. 2 or any other image-capture device (e.g., a LIDAR unit such as the LIDAR unit 132 depicted in FIG. 1), may be coupled to the first vehicle and may be in communication with the computing device. The image-capture device may be configured to capture images or a video of a road of travel of the first vehicle and vicinity of the road. The computing device may be configured to receive a sequence of images or a video and identify, using image processing techniques for example, objects depicted in the image or the video. Examples of objects may include vehicles, moving or static objects, traffic signs, obstacles on the road, pedestrians, lane markers, etc.

Figure 4:
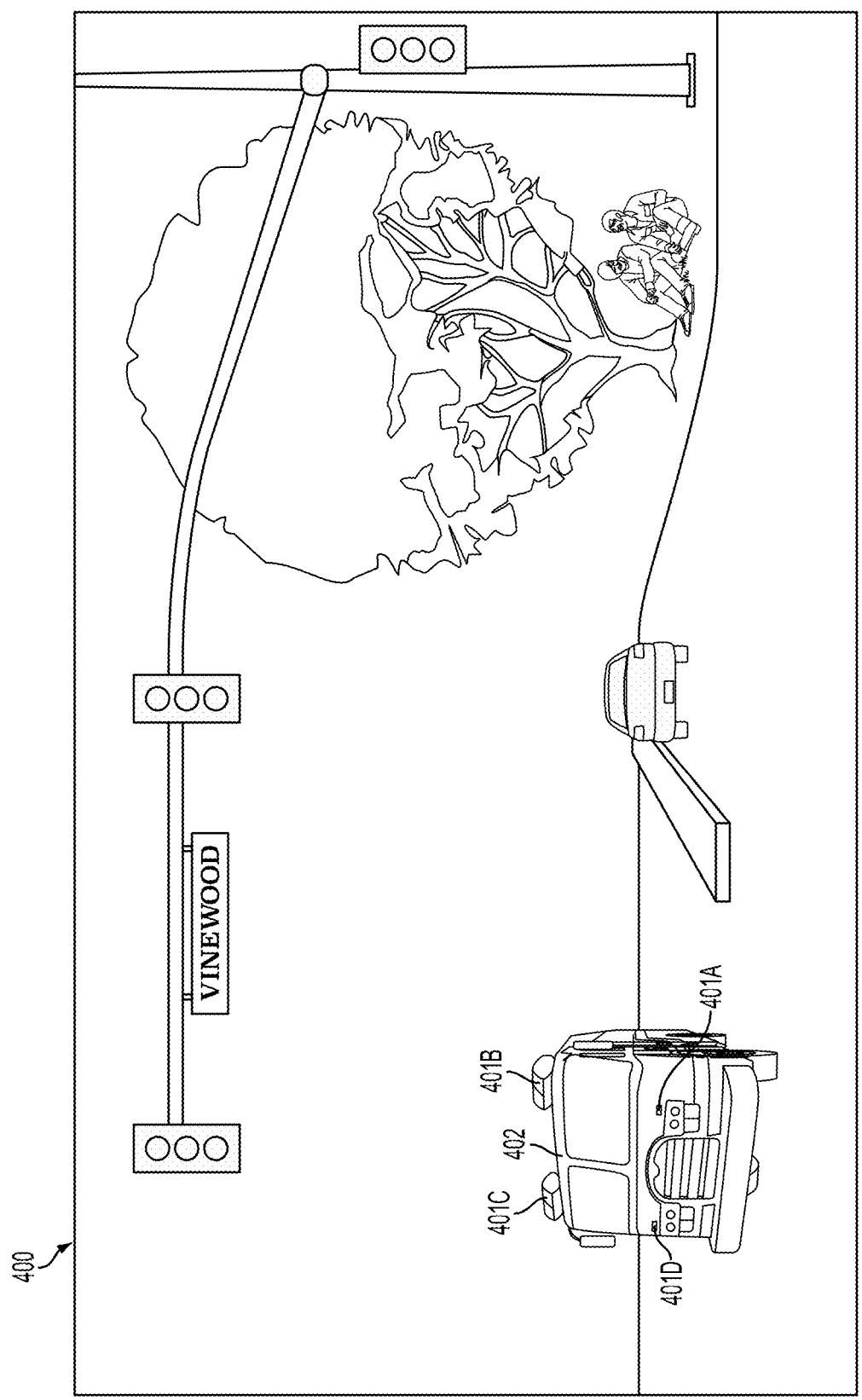
FIG. 4 illustrates an image depicting an emergency vehicle, in accordance with an example embodiment.

FIG. 4 illustrates an image 400 depicting an emergency vehicle 402, in accordance with an example embodiment. The image 400 may be captured from a camera coupled to the first vehicle (not shown), for example. The image 400 depicts a vicinity of the first vehicle and includes the emergency vehicle 402, which is a fire truck in this case. The emergency vehicle 402 is characterized by four flashing lights 401A, 401B, 401C, and 401D as depicted in FIG. 4. Although a fire truck is used herein to illustrate the method 300, the method 300 can be implemented to identify any other type of vehicle having a flashing light.

The computing device may receive a second image (not shown) captured subsequent to capturing the first image. The computing device may receive a sequence of images captured depicting the vehicle 402 and may be configured to monitor the vehicle 402 across the sequence of images (or frames). In one example, the images may be captured at a particular frequency (e.g., 10 Hz or 10 pictures per second or any other frequency suitable for a given type of flashing lights). In an example, the first image and the second image may be captured consecutively. In another example, the first image and the second image may not be captured consecutively. For instance, if a given type of vehicle has a flashing light that is flashing at a slow frequency, the computing device may be configured to detect the vehicle 402 in a first image, skip over a number of images in the sequence of images, and detect the vehicle 402 in a second image captured subsequently but not consecutive to the first image. The method 300 illustrates detecting a number and type of flashing lights (such as the flashing lights 401A, 401B, 401C, and 401D) associated with the emergency vehicle 402, determining the type of the emergency vehicle 402 based on the number and type of flashing lights, and controlling the first vehicle based on the determination.

Figure 5:
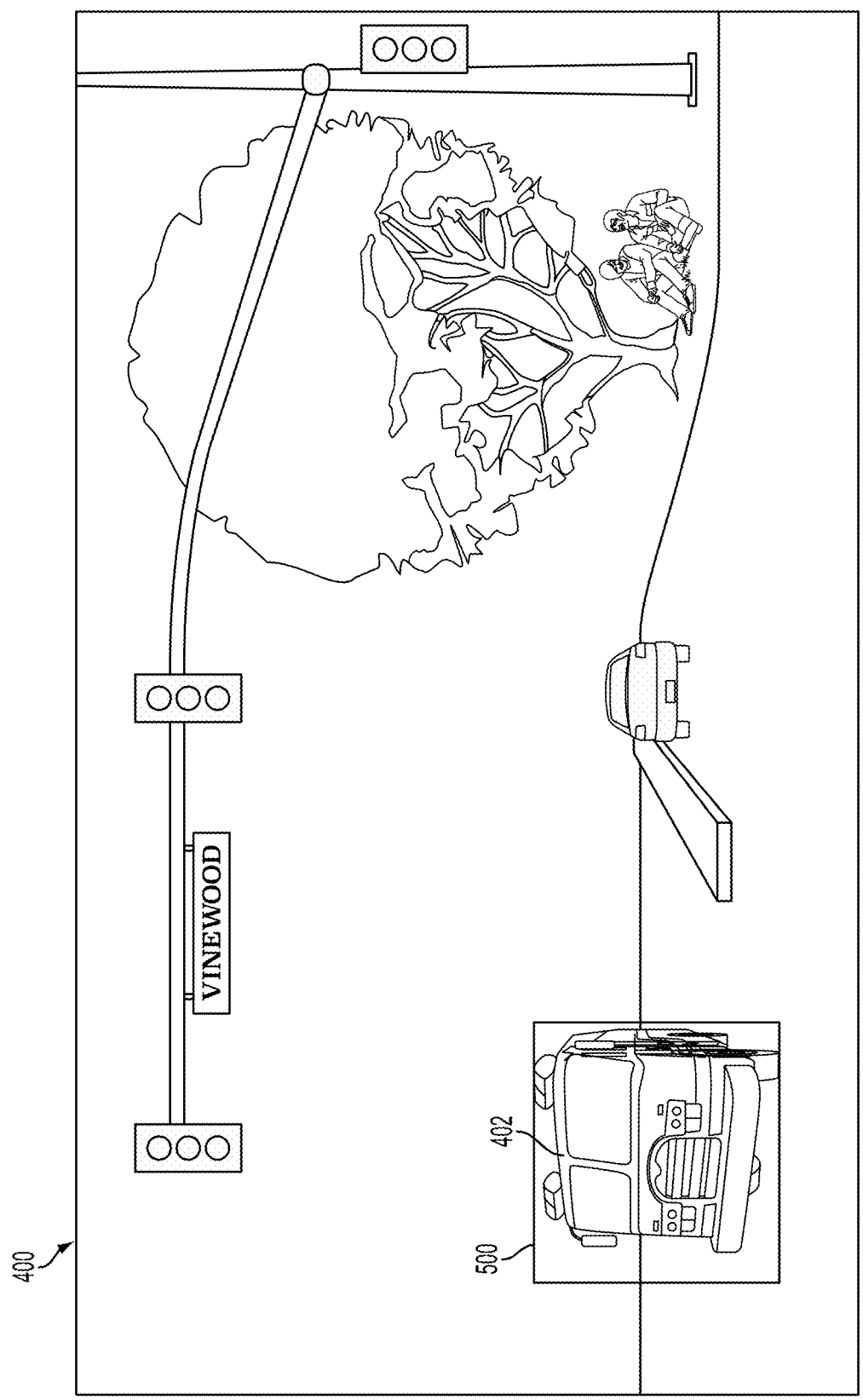
FIG. 5 illustrates an image region bounding the emergency vehicle, in accordance with an example embodiment.

Referring back to FIG. 3, at block 304, the method 300 includes determining, in the first image and the second image, an image region that bounds the second vehicle such that the image region substantially encompasses the second vehicle. FIG. 5 illustrates an image region bounding the emergency vehicle 402, in accordance with an example embodiment. For example, the computing device may be configured to determine an image region that encompasses pixels in the first image and the second image that represent the emergency vehicle 402. For example, the image region may be determined based on detecting edges or boundaries of the emergency vehicle 402 and determining an area in the image that surrounds or encompasses the emergency vehicle 402 accordingly. The image region may have any type of a geometric shape. For example, referring to FIG. 5, the image region may take a shape of a box 500 that substantially encompasses the emergency vehicle 402. However, the shape can be any type of geometric shape (e.g., a circle, an ellipse, a square, etc.).

The word "substantially" is used herein to indicate, for instance, that the image region, such as the box 500, encompasses a certain percentage of image space or percentage of pixels that represent the emergency vehicle 402. For instance, the image region may substantially encompass the emergency vehicle 402 or the pixels if the image region includes at least 95% of the pixels representing the emergency vehicle 402 in the image 400. In another example, the image region may be larger than the emergency vehicle 402 such that the emergency vehicle 402 is wholly surrounded by the image region, i.e., the box 500. These example shapes and example percentages are used as examples for illustration only, and other shapes and percentages can be used as well.

Tracing the emergency vehicle 402 across multiple images may be difficult. In one example, as the emergency vehicle 402 moves relative to the first vehicle, the emergency vehicle 402 changes position, i.e., shifts horizontally, in sequential images or frames. In another example, the box 500 may not be determined accurately in each image (e.g., the box 500 may be slightly shifted relative to location of the emergency vehicle 402 in a given image). As still another example, assuming that the first vehicle approaches the emergency vehicle 402, a size of the area of a given image depicting the emergency vehicle 402 may increase in size. Similarly, a size of the area of a given image depicting the emergency vehicle 402 may decrease if the emergency vehicle 402 moves farther away from the first vehicle. Such changes in size and position of the emergency vehicle 402 may lead to inaccurate determination of the box 500. Slight errors in position or size may accumulate over a sequence of images and may affect accuracy of tracing the emergency vehicle 402 across the sequence of images, and may thus affect estimating the type of emergency vehicle 402 and the number and types of flashing lights of the emergency vehicle 402. As described below, at block 306, the method 300 illustrates partitioning the box 500 using a polar grid into a plurality of polar bins to enhance accuracy of estimating the type of the emergency vehicle 402 and the number and types of flashing lights.

Referring back to FIG. 3, at block 306, the method 300 includes determining a polar grid that partitions the image region in the first image and the second image into a plurality of polar bins, where each polar bin includes a sector of the image region. To enhance object detection and tracing, the computing device may transform the image region encompassing the second vehicle (such as the box 500 encompassing the emergency vehicle 402) into a polar grid or an angular region.

Figure 6:
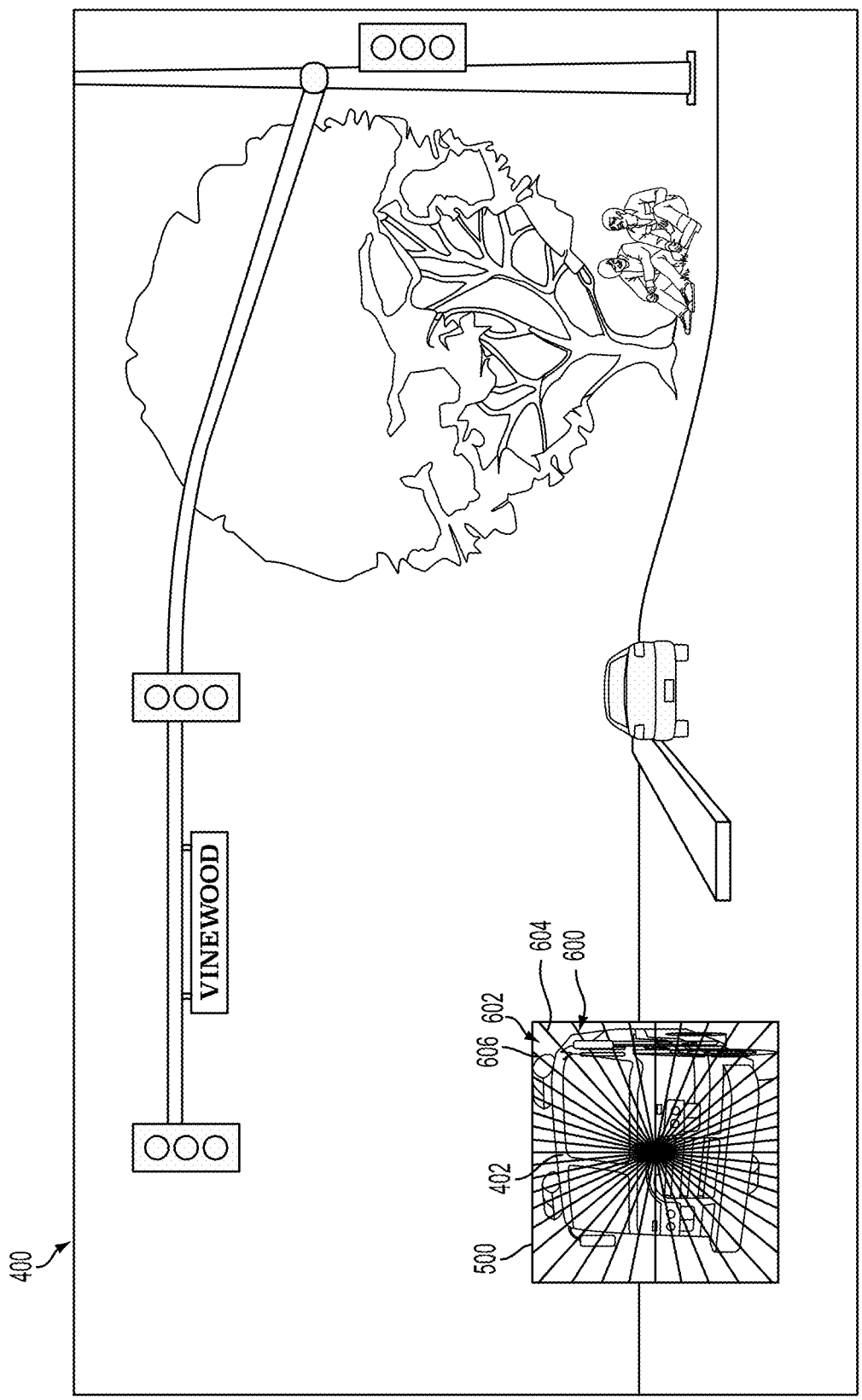
FIG. 6 illustrates a polar grid configured to partition the image region into a plurality of polar bins, in accordance with an example embodiment.

FIG. 6 illustrates a polar grid configured to partition the image region into a plurality of polar bins, in accordance with an example embodiment. FIG. 6 depicts a polar grid 600 that partitions the box 500 into a plurality of polar bins, such as polar bin 602. Each polar bin includes or encompasses a sector of the box 500. As an example, each polar bin may be defined by two lines, such as lines 604 and 606, extending from a center region of the box 500 to about a boundary of the box 500. The center region may be defined by a group of pixels within a threshold number of pixels (or a threshold distance) from a center of the box 500, for example. Similarly, the lines extend to about a boundary of the box indicates that the lines extend to within a threshold number of pixels or threshold distance from a boundary of the box 500. However, the polar bins may take other shapes as well. The threshold number of pixels of threshold distance may be predefine or previously determined.

Figure 7:
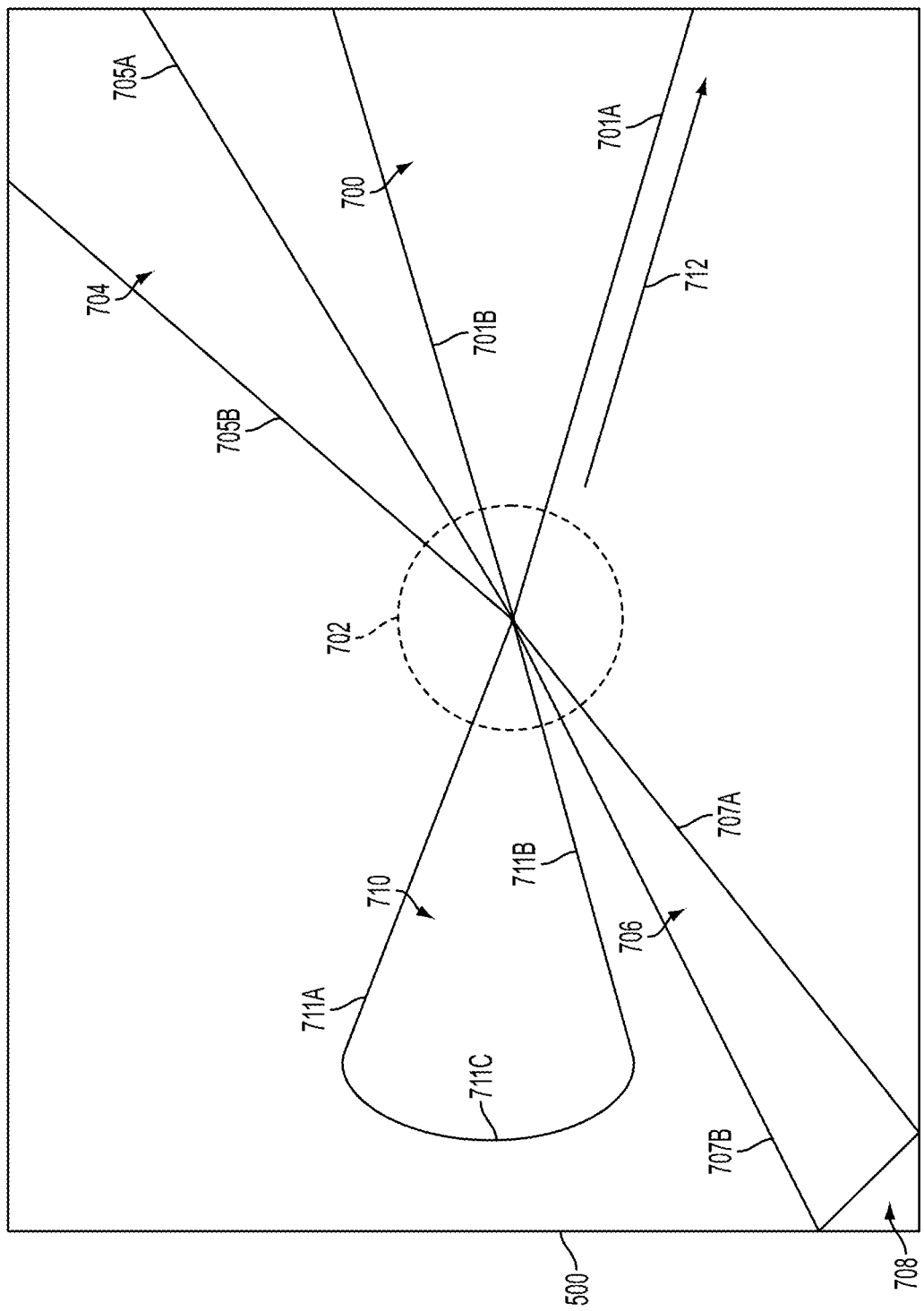
FIG. 7 illustrates example types of polar bins, in accordance with an example embodiment.

FIG. 7 illustrates example types of polar bins, in accordance with an example embodiment. For example, FIG. 7 depicts a triangular polar bin 700 defined by two lines 701A and 701B extending from a center region 702 bounded by circle to about a boundary of the box 500. As described above, the center region 702 may be defined to be a region that is within a particular number of pixels or a particular threshold distance from a center of the box 500. Similarly, lines 701A and 701B extend to about a boundary of the box 500 indicating that the lines 701A and 701B extend to within a threshold number of pixels or threshold distance from a boundary of the box 500. Although the center region 702 is shown as a circle, the center region may take other forms and geometric shapes as well (e.g., a square, rectangle, ellipse, etc.).

FIG. 7 also depicts polar bin 704 shaped as a quadrilateral. The polar bin 704 is defined by two lines 705A and 705B extending from the center region 702 to about respective boundaries of the box 500. Because each line extends to a different boundary, the polar bin 704 takes the shape of a quadrilateral instead of a triangle. However, polar bin 706, for example, is defined as a triangle despite being defined by two lines 707A and 707B extending from the center region 702 to different boundaries of the box 500. In this case a small region 708 is not included in the polar bin 706. FIG. 7 also depicts polar bin 710 defined by two lines 711A and 711B extending from the center region 702 but do not reach the boundary of the box 500 and bounded by a curved line 711C instead of a straight line as polar bins 700, 704, and 706. These polar bin shapes are examples for illustration and other shapes are also possible.

Partitioning the box 500 into a plurality of polar bins may improve accuracy of tracing a given object. A polar bin, such as the polar bin 700 is characterized by encompassing a small area of an image close to a center of the box 500, yet encompassing a larger area of the image close to the boundary of the box 500 (i.e., the polar bin 700 encompasses a progressively larger area of the image or the box 500 in a direction of arrow 712). In examples, flashing lights are disposed at extremities or edges of a given vehicle such as the emergency vehicle 402. Thus, the flashing lights are likely to be included within a portion of the polar bin that encompasses a larger image area. Tracing a flashing light in the larger area of the polar bin may be tolerant to position errors in location of a flashing light from one image to a subsequent image (or from a polar bin in a given image to a corresponding polar bin in a subsequent image). Even if a location of a flashing light moves from a given location in a polar bin in a given image to a different location within a corresponding polar bin in a subsequent image, the flashing light may still be traced accurately because the flashing light may remain within the corresponding polar bin as opposed to shifting to a different polar bin.

Furthermore, the polar bins may be non-uniform in size. Some polar bins may be larger than others. For example, the polar bin 700 is larger than the polar bin 706 as shown in FIG. 7. In an example, if the computing device determines that several polar bins do not include image regions with potential flashing lights, the computing device may merge such polar bins into a single polar bin to enhance computational efficiency. Enhancing computational efficiency enables real-time analysis and determination of types of vehicles and flashing lights.

Further, as described above, a given polar bin includes a smaller image region in a part of the polar bin that is closer to a center of the box 500 that is unlikely to include a flashing light. Thus, the computing device may determine an area around a center of the box 500 that defines regions within the polar bins of the polar grid that may be disregarded when identifying flashing lights. Thus, the computing device may not take into consideration portions of the polar bins that lay within that area when analyzing a given image to identify flashing lights. In this manner, the computing device may enhance computational efficiency further by reducing amount of data to be analyzed. The area around the center of the box 500 may take any geometric shape (e.g., a circle, square, rectangle, etc.). In one example, the area may be related to the center region 702. In another example, the area may not be related to the center region 702, i.e., the area may have a different shape and/or size compared to the center region 702.

Referring back to FIG. 6, the computing device may be configured to determine the polar grid 600 configured to partition the box 500 into a plurality of polar bins having shapes similar to shapes of any of the polar bins 700, 704, 706, and 710 or a combination thereof. The polar grid can partition the box 500 to any number of polar bins. As an example for illustration, FIG. 6 depicts forty four polar bins. However, any other number of polar bins can be used (e.g., twelve bins).

Figure 8:
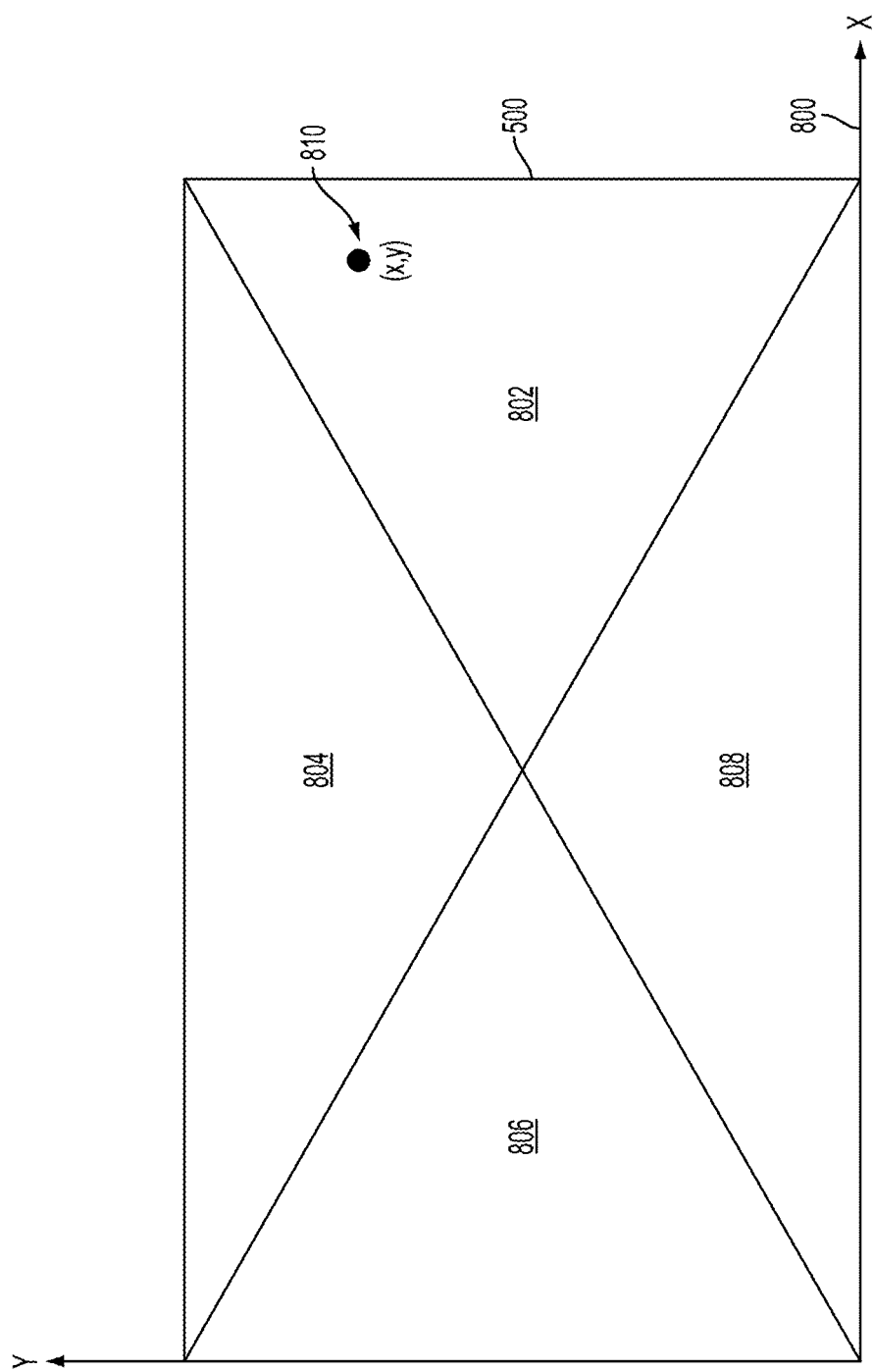
FIG. 8 illustrates assigning a pixel within the image region to a polar bin, in accordance with an example embodiment.

In an example, the computing device may assign each pixel in the image region within the box 500 to one of the polar bins. FIG. 8 illustrates assigning a pixel within the image region to a polar bin, in accordance with an example embodiment. FIG. 8 depicts the box 500 and Cartesian coordinate system 800. As an example for illustration, the computing device may determine a polar grid that partitions the box 500 into four polar bins 802, 804, 806, and 808. Each polar bin may be assigned an index number. For instance, polar bin 802 may be assigned an index number "0," polar bin 804 may be assigned an index number "1," polar bin 806 may be assigned an index number "2," and polar bin 808 may be assigned an index number "3." In this example, each pixel within the box 500 such as pixel 810 having coordinates (x, y) can be assigned to one of the four polar bins 802, 804, 806, and 808 using the following equation:

$$\text{index} = \text{floor}\left(N * \frac{\text{atan2}\left(\frac{y}{x}\right) + \pi}{2 * \pi}\right) \quad \text{Equation (1)}$$

where N is the number of polar bins (4 in this example), "floor" is a function that is configured to map a real number to the largest previous integer, respectively, and where "atan2" is four-quadrant inverse tangent (arctangent) function of coordinates y and x. The "floor" function can also be referred to as the greatest integer function. As an example, consider the fraction 12/5, which equals 2.4. The "floor" of (12/5) equals 2. Equation (1) returns an index number 0, 1, 2, or 3 that determines whether the pixel 810 belongs to polar bin 802, 804, 806, or 808, respectively.

It is noted that equation (1) is an example for illustration only and is not limiting. Other functions can be implemented to assign the pixel 810 to a polar bin. Also, the four polar bins are used herein as an example for illustration. For instance the polar grid may partition the box 500 into a larger number of bins (e.g., twelve polar bins). The polar bins may have different shapes and configurations. In these examples, different equations or algorithms may be used to assign the pixel 810 to a particular polar bin.

In this manner, the image region or the box 500 encompassing the emergency vehicle 402 in the first image, and the corresponding region in the second image may be partitioned into a respective plurality of bins. Thus, a polar bin in the polar grid of the first image has a corresponding polar bin in the polar grid of the second image, and in subsequent images captured for the emergency vehicle 402.

Referring back to FIG. 3, at block 308, the method 300 includes identifying, based on a comparison of image content of polar bins in the first image to image content of corresponding polar bins in the second image, one or more portions of image data exhibiting a change in color and a change in brightness between the first image and the second image. The computing device may identify bright lights within each polar grid bin in a first image. For example, the computing device may determine a number of image portions that exhibit characteristics of a bright light having an intensity greater than a threshold intensity. As an example, the threshold intensity may represent a predetermined or predefined brightness threshold indicative of a minimum brightness associated with flashing lights an emergency vehicle, a vehicular turn signal, brake lights, etc. Within each corresponding polar bin in the second image, the computing device may identify image portions corresponding to the image portions identified in the first image. The computing device may then determine a change in color and a change in brightness for the image portions from the polar bin in the first image to the corresponding polar bin in the second image.

In an example, the computing device may be configured to perform a pixel-level comparison between pixels in a polar in in the first image and pixels in a corresponding polar bin in the second images to identify differences or changes in color and intensities. In another example, to determine a difference between content of a polar bin in the first image and content of a corresponding polar bin in the second image, the computing device may be configured to subtract the content of polar bin from the content of the corresponding polar bin, or vice versa.

In examples, each pixel within a polar bin may be assigned numerical values that represent color and intensity attributes of the pixel. Intensity may refer to a brightness level of a given pixel, for example. Brightness may be an attribute of visual perception in which a source appears to be radiating or reflecting light. In other words, brightness may be a perception produced by luminance of a visual target, such as light of a vehicular signal. Example cylindrical-coordinate representations of pixels in a Red, Green, Blue (RGB) model may include HSL representation (hue, saturation, and lightness), or HSV (hue, saturation, and value) representation. The HSV representation can also be referred to as HSB, where B stands for Brightness.

Subtracting content of a polar bin in the first image from content of a corresponding polar bin in the second image may include subtracting HSV or HSL values of pixels of the first image from respective HSV or HSL values of respective pixels of the second image, for example. HSL and HSV are used herein as examples only, and any other numerical or qualitative representation can be used to assign intensity and color attributes or characteristics to pixels within a polar bin of a given image.

In an example, the computing device may be configured to generate a polar histogram for the image region, e.g., the box 500. For each polar bin, the computing device may assign an index number to an identified bright region, and store an intensity value and/or a color value for the identified bright region. The computing device may generate a polar histogram for the image region indicative of the number of identified bright regions, and associated intensity and color values. The computing device may be configured to generate a respective polar histogram for images of the sequence of images (e.g., for the first image and the second image). Based on comparing the polar histograms of a given image and a subsequent image, the computing device may be configured to determine changes in color and intensity associated with content of a particular polar bin in the given image and a corresponding polar bin in the subsequent image.

Referring back to FIG. 3, at block 310, the method 300 includes determining a type of the one or more flashing light signals of the second vehicle and a type of the second vehicle based on (i) a number of portions of image data exhibiting the change in color and the change in brightness, (ii) the color of the one or more portions, (iii) and the brightness of the one or more portions.

Figure 9:
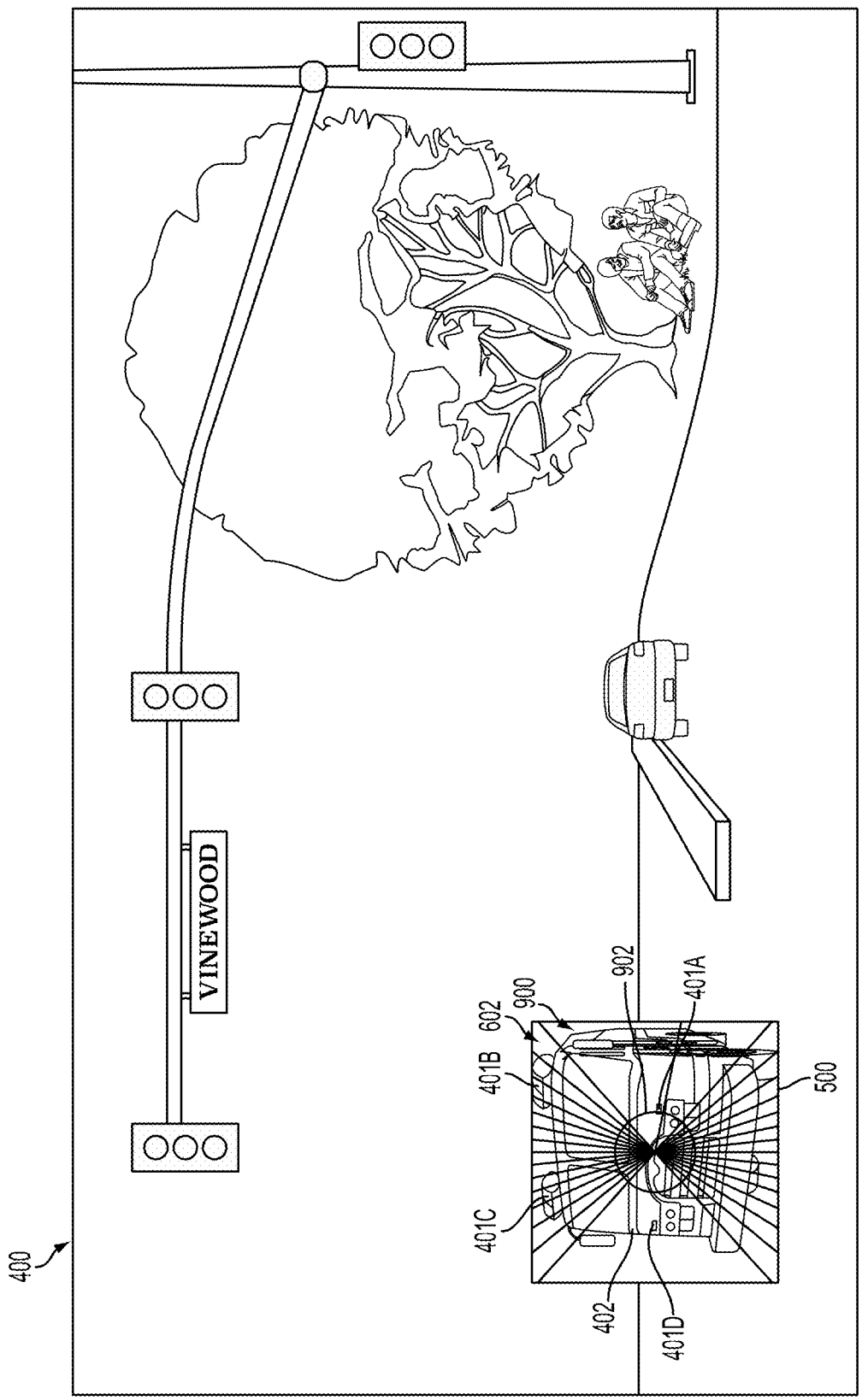
FIG. 9 illustrates determining a number of flashing lights and a type of the emergency vehicle, in accordance with an example embodiment.

FIG. 9 illustrates determining a type of the emergency vehicle 402, in accordance with an example embodiment. Based on comparing content of polar bins in the first image with content of corresponding polar bins in the second image, the computing device may be configured to determine a number of portions of image data exhibiting a change in color and/or brightness. Thus, the computing device may estimate a number of flashing lights associated with the emergency vehicle 402.

In examples, the computing device may trace the flashing lights identified in the polar bins across a sequence of images and determine characteristics or parameters of repetitive or cyclical change in color or brightness of the flashing lights across the images and accordingly determine types of the flashing lights. For instance, the computing device may determine one or more temporal characteristics indicative of a frequency of the change in brightness of image portions representing flashing lights in the images. The computing device may, for example, trace oscillation in intensity values overtime for a given flashing light. The oscillation may match behavior of a particular type of flashing light (e.g., match a blinking rate of vehicular turn signal that turns 'on' and 'off' at a certain frequency, match blinking frequency of flashing light of a fire truck, or match a blinking frequency of a police car blue flashing light, etc.).

In this manner, the computing device may determine a number and type of flashing lights associated with the emergency vehicle 402. Based on determining the number and type of flashing lights, the computing device may determine the type of the emergency vehicle. As shown in FIG. 9, the emergency vehicle 402 has the four flashing lights 401A, 401B, 401C, and 401D. The flashing lights 401A, 401B, 401C, and 401D may have red/orange colors, for example. Based on determining the number of the flashing lights 401A, 401B, 401C, and 401D and the associated colors, the computing device may determine that the emergency vehicle 402 is a fire truck.

FIG. 9 depicts polar bins having different sizes, i.e., non-uniform in size. Some polar bins may be larger than others. For example, polar bin 900 is larger than the polar bin 602. As described with respect to FIG. 7, if the computing device determines that several polar bins do not include image regions representing potential flashing lights, the computing device may merge such polar bins into a single polar bin to enhance computational efficiency. Thus, as an example, the polar bin 900 results from merging several polar bins similar to the polar bin 602.

Also, as described above with respect to FIG. 7, a given polar bin encompasses a smaller image area in a part of the polar bin that is closer to the center of the box 500 that is unlikely to include a flashing light. Thus, the computing device may determine an area, such as area 902 defined by a circle, that defines regions within the polar bins of the polar grid that may be disregarded when identifying flashing lights. In other words, the computing device may not take into consideration portions of the polar bins that lay within the area 902 when analyzing a given image to identify flashing lights. In this manner, the computing device may enhance computational efficiency further by reducing amount of data to be analyzed. However, in other examples, the computing device may take the entire content of the polar bins into consideration when identifying flashing lights.

Figure 10:
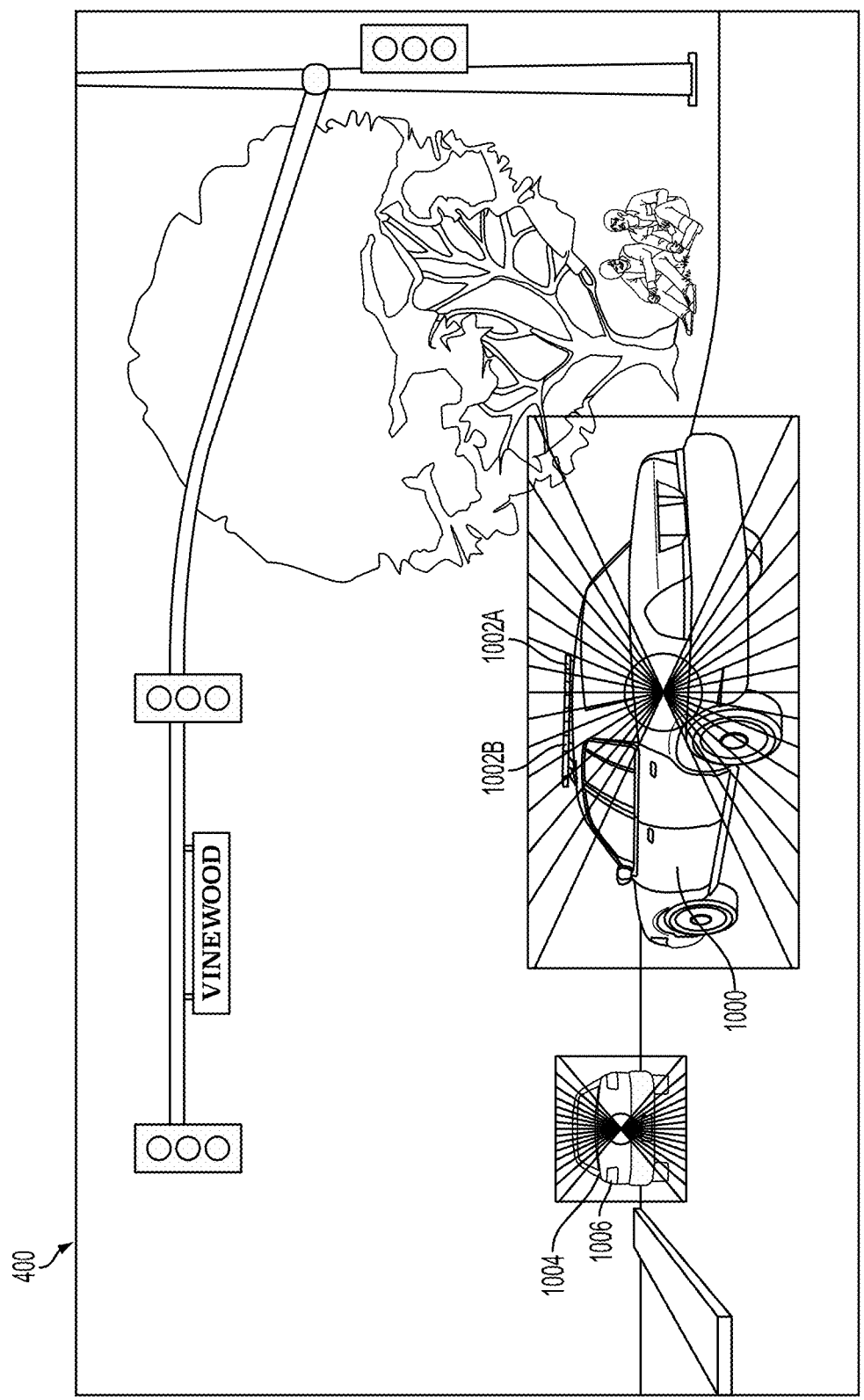
FIG. 10 illustrates other examples of determining types of vehicles, in accordance with an example embodiment.

Although the method 300 is described in the context of detecting an emergency vehicle, the method 300 can be used to detect any other type of light signals such as a brake light, headlamp light, an auxiliary lamp light, or turn signals. FIG. 10 illustrates other examples of determining types of vehicles, in accordance with an example embodiment. FIG. 10 depicts a vehicle 1000 having two flashing lights 1002A and 1002B. The computing device may identify the flashing lights 1002A and 1002B and determine that they exhibit a blue color. Accordingly, the computing device may determine that the vehicle 1000 is a police vehicle, for example. Similarly, the computing device may detect a vehicle 1004, and identify a flashing vehicular turn signal 1006 based on determining a color of the flashing vehicular turn signal 1006 and a blinking rate of the vehicular turn signal 1006, for example.

Referring back to FIG. 3, at block 312, the method 300 includes providing, by the computing device, instructions to control the first vehicle based on the type of the second vehicle and the type of the one or more flashing light signals. A control strategy and driving behavior of the first vehicle may be influenced by types of vehicles in a vicinity of the first vehicle. For example, a more defensive (e.g., cautious) behavior may be selected and implemented by the computing device to control the first vehicle if an emergency vehicle (e.g., a fire truck, ambulance, police vehicle) is in a vicinity of the first vehicle. As another example, the computing device may be configured to detect presence of another vehicle with a flashing turning signal and may be configured to control the first vehicle based on the detection.

The control system of the first vehicle may support multiple control strategies and associated driving behaviors that may be predetermined or adaptive to changes in a driving environment of the first vehicle. Generally, a control strategy may comprise sets of rules associated with traffic interaction in various driving contexts. The control strategy may comprise rules that determine a speed of the first vehicle and a lane that the first vehicle may travel on while taking into account safety and traffic rules and concerns (e.g., presence of emergency vehicles, vehicles having active turn signals, etc.). For instance, the computing device may be configured to determine that a given vehicle in front of the first vehicle has an active turn signal to the left or right. The given vehicle may, for example, change lines to a lane currently occupied by the first vehicle, and the computing device may provide instructions for the first vehicle to slow down or change lanes. As another example, the computing device may determine that there is a fire truck in the vicinity of the first vehicle and cause the first vehicle to stop and allow the fire truck to pass. Thus, the computing device may be configured to select a control strategy comprising rules for actions that control the first vehicle based on detecting types of vehicles in the vicinity and types of flashing lights associated with the vehicles.

In an example, a given control strategy may comprise a program or computer instructions that characterize actuators controlling the first vehicle (e.g., throttle, steering gear, brake, accelerator, or transmission shifter) based on determining that there is an emergency vehicle in the vicinity of the first vehicle or that a given vehicle has an active turn signal. The given control strategy may include action sets ranked by priority, and the action sets may include alternative actions that the first vehicle may be configured to take to accomplish a task (e.g., driving from one location to another). The alternative actions may be ranked based on whether an emergency vehicle is present in a vicinity of the first vehicle, for example.

As another example, providing instructions to control the first vehicle may comprise determining a desired path of the first vehicle based on determining whether a given vehicle in a vicinity of the first vehicle is an emergency vehicle or has an active turn signal. In this example, the computing device may be configured to change the path of the first vehicle to take into account the likelihood that the given vehicle may change lanes and influence a current path of the first vehicle.

These control actions and driving situations are for illustration only. Other actions and situations are possible as well. In one example, the computing device may be configured to control the vehicle based on the modified control strategy as an interim control until a human driver can take control of the vehicle.

In some embodiments, the disclosed methods may be implemented as computer program instructions encoded on a computer-readable storage media in a machine-readable format, or on other non-transitory media or articles of manufacture. FIG. 11 is a schematic illustrating a conceptual partial view of an example computer program product 1100 that includes a computer program for executing a computer process on a computing device, arranged according to at least some embodiments presented herein. In one embodiment, the example computer program product 1100 is provided using a signal bearing medium 1101. The signal bearing medium 1101 may include one or more program instructions 1102 that, when executed by one or more processors (e.g., processor 113 in the computing device 111) may provide functionality or portions of the functionality described above with respect to FIGS. 1-10. Thus, for example, referring to the embodiments shown in FIG. 3, one or more features of blocks 302-312 may be undertaken by one or more instructions associated with the signal bearing medium 1101. In addition, the program instructions 1102 in FIG. 11 describe example instructions as well.

In some examples, the signal bearing medium 1101 may encompass a computer-readable medium 1103, such as, but not limited to, a hard disk drive, a Compact Disc (CD), a Digital Video Disk (DVD), a digital tape, memory, etc. In some implementations, the signal bearing medium 1101 may encompass a computer recordable medium 1104, such as, but not limited to, memory, read/write (R/W) CDs, R/W DVDs, etc. In some implementations, the signal bearing medium 1101 may encompass a communications medium 1105, such as, but not limited to, a digital and/or an analog communication medium (e.g., a fiber optic cable, a waveguide, a wired communications link, a wireless communication link, etc.). Thus, for example, the signal bearing medium 1101 may be conveyed by a wireless form of the communications medium 1105 (e.g., a wireless communications medium conforming to the IEEE 802.11 standard or other transmission protocol).

The one or more programming instructions 1102 may be, for example, computer executable and/or logic implemented instructions. In some examples, a computing device such as any of the computing devices described with respect to FIGS. 1-10 may be configured to provide various operations, functions, or actions in response to the programming instructions 1102 conveyed to the computing device by one or more of the computer readable medium 1103, the computer recordable medium 1104, and/or the communications medium 1105. It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

IV. CONCLUSION

It should be understood that arrangements described herein are for purposes of example only. As such, those skilled in the art will appreciate that other arrangements and other elements (e.g., machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims, along with the full scope of equivalents to which such claims are entitled. It is also to be understood that the terminology used herein is for the purpose of describing particular embodiments only, and is not intended to be limiting.

Where example embodiments involve information related to a person or a device of a person, some examples may include privacy controls. Such privacy controls may include, at least, anonymization of device identifiers, transparency and user controls, including functionality that would enable users to modify or delete information relating to the user's use of a product.

Further, in situations in where embodiments discussed herein collect personal information about users, or may make use of personal information, the users may be provided with an opportunity to control whether programs or features collect user information (e.g., information about a user's medical history, social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

What is claimed is:

1. A method comprising:
    receiving, at a computing device of a first vehicle, a first image of a second vehicle captured by an image-capture device coupled to the first vehicle and a second image captured by the image-capture device subsequent to capturing the first image, wherein the second vehicle has one or more flashing light signals;
    determining a grid that partitions an image region in the first image and the second image into a plurality of bins, wherein each bin of the plurality of bins encompasses an area of the image region that expands in a radially-outward direction and narrows in a radially-inward direction;
    identifying, based on a comparison of image content of bins in the first image to image content of corresponding bins in the second image, one or more portions of image data exhibiting a change in brightness between the first image and the second image;
    determining a type of the one or more flashing light signals of the second vehicle based on the one or more portions exhibiting the change in brightness; and
    controlling the first vehicle based on the type of the one or more flashing light signals.

2. The method of claim 1, wherein identifying the one or more portions of image data comprises:
    within each bin in the first image, identifying image portions that exhibit characteristics of a bright light having an intensity greater than a threshold intensity;
    within each corresponding bin in the second image, identifying corresponding image portions; and
    determining the change in brightness for the image portions from the bin in the first image to the corresponding bin in the second image.

3. The method of claim 1, wherein the bins are non-uniform in size.

4. The method of claim 1, determining that several bins of the plurality of bins are void of image pixels exhibiting the change in brightness between the first image and the second image; and
    merging the several bins into a single bin.

5. The method of claim 1, further comprising:
    wherein the image region bounds the second vehicle such that the image region substantially encompasses the second vehicle.

6. The method of claim 5, wherein the second vehicle is moving relative to the first vehicle such that the image region that bounds the second vehicle in the first image is different from a respective image region that bounds the second vehicle in the second image.

7. The method of claim 1, further comprising:
    assigning each pixel in the image region to a respective bin of the bins.

8. The method of claim 1, further comprising:
    determining a type of the second vehicle based on (i) a number of the one or more portions of image data exhibiting the change in brightness, (ii) color of the one or more portions of image data, and (iii) the brightness of the one or more portions of image data, wherein controlling the first vehicle is further based on the type of the second vehicle.

9. The method of claim 1, wherein determining the type of a given flashing light signal of the one or more flashing light signals comprises determining that the given flashing light is a vehicular turn signal or a brake light.

10. The method of claim 1, wherein the first image and the second image are captured consecutively.

11. The method of claim 1, wherein the computing device is configured to control the first vehicle in an autonomous operation mode.

12. A non-transitory computer readable medium having stored thereon executable instructions that, upon execution by a computing device of a first vehicle, cause the computing device to perform operations comprising:
    receiving a first image of a second vehicle captured by an image-capture device coupled to the first vehicle and a second image captured by the image-capture device subsequent to capturing the first image, wherein the second vehicle has one or more flashing light signals;
    determining a grid that partitions an image region in the first image and the second image into a plurality of bins, wherein each bin of the plurality of bins encompasses an area of the image region that expands in a radially-outward direction and narrows in a radially-inward direction;
    identifying, based on a comparison of image content of bins in the first image to image content of corresponding bins in the second image, one or more portions of image data exhibiting a change in brightness between the first image and the second image;
    determining a type of the one or more flashing light signals of the second vehicle based on the one or more portions exhibiting the change in brightness; and
    controlling the first vehicle based on the type of the one or more flashing light signals.

13. The non-transitory computer readable medium of claim 12, wherein identifying the one or more portions of image data comprises:
    within each bin in the first image, identifying image portions that exhibit characteristics of a bright light having an intensity greater than a threshold intensity;
    within each corresponding bin in the second image, identifying corresponding image portions; and determining the change in brightness for the image portions from the bin in the first image to the corresponding bin in the second image.

14. The non-transitory computer readable medium of claim 12, wherein the bins are non-uniform in size.

15. The non-transitory computer readable medium of claim 12, wherein the operations further comprise:
   determining that several bins of the plurality of bins are void of image pixels exhibiting the change in brightness between the first image and the second image; and
   merging the several bins into a single bin.

16. The non-transitory computer readable medium of claim 12, wherein the operations further comprise:
   assigning each pixel in the image region to a respective bin of the bins.

17. A system comprising:
   an image-capture device coupled to a first vehicle;
   at least one processor in communication with the image-capture device; and
   a memory having stored thereon executable instructions that, upon execution by the at least one processor, cause the at least one processor to perform operations comprising:
      receiving a first image of a second vehicle captured by the image-capture device and a second image captured by the image-capture device subsequent to capturing the first image, wherein the second vehicle has one or more flashing light signals,
      determining a grid that partitions an image region in the first image and the second image into a plurality of bins, wherein each bin of the plurality of bins encompasses an area of the image region that expands in a radially-outward direction and narrows in a radially-inward direction,
      identifying, based on a comparison of image content of bins in the first image to image content of corresponding bins in the second image, one or more portions of image data exhibiting a change in brightness between the first image and the second image,
      determining a type of the one or more flashing light signals of the second vehicle based on the one or more portions exhibiting the change in brightness, and
      controlling the first vehicle based on the type of the one or more flashing light signals.

18. The system of claim 17, wherein identifying the one or more portions of image data comprises:
   within each bin in the first image, identifying image portions that exhibit characteristics of a bright light having an intensity greater than a threshold intensity;
   within each corresponding bin in the second image, identifying corresponding image portions; and
   determining the change in brightness for the image portions from the bin in the first image to the corresponding bin in the second image.

19. The system of claim 17, wherein the operations further comprise:
   determining that several bins of the plurality of bins are void of image pixels exhibiting the change in brightness between the first image and the second image; and
   merging the several bins into a single bin such that the bins become non-uniform in size.

20. The system of claim 17, wherein the operations further comprise:
   assigning each pixel in the image region to a respective bin of the bins.

* * * * *